US007818311B2

(12) United States Patent
Michailov

(10) Patent No.: US 7,818,311 B2
(45) Date of Patent: Oct. 19, 2010

(54) COMPLEX REGULAR EXPRESSION CONSTRUCTION

(75) Inventor: Zlatko Velkov Michailov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 475 days.

(21) Appl. No.: 11/861,198

(22) Filed: Sep. 25, 2007

(65) Prior Publication Data

US 2009/0083265 A1 Mar. 26, 2009

(51) Int. Cl.
*G06F 17/30* (2006.01)
*G06F 7/00* (2006.01)

(52) U.S. Cl. ....................... 707/708; 707/694; 707/755; 707/769; 717/143

(58) Field of Classification Search ....................... None
See application file for complete search history.

(56) References Cited

U.S. PATENT DOCUMENTS

| | | | | |
|---|---|---|---|---|
| 5,526,477 | A | 6/1996 | McConnell | |
| 6,618,697 | B1 | 9/2003 | Kantrowitz | |
| 6,684,381 | B1 | 1/2004 | Bening | |
| 6,714,905 | B1 * | 3/2004 | Chang et al. | 704/9 |
| 7,093,231 | B2 | 9/2007 | Alderson | |
| 2002/0129005 | A1 | 9/2002 | Ojanen | |
| 2004/0002850 | A1 | 1/2004 | Shaefer | |
| 2004/0111400 | A1 | 6/2004 | Chevalier | |
| 2005/0097514 | A1 | 5/2005 | Nuss | |
| 2006/0167873 | A1 | 7/2006 | Degenaro | |
| 2006/0179054 | A1 | 8/2006 | Levi | |

OTHER PUBLICATIONS

A Grammar for Regular Expressions http://www.cs.auckland.ac.nz/compsci330s1c/lectures/330ChaptersPDF/App2.pdf. Last accessed Sep. 25, 2007.

Regular Expressions. The Single UNIX® Specification, Version 2, 1997, The Open Group. http://www.opengroup.org/onlinepubs/007908799/xbd/re.html. Last accessed Sep. 25, 2007.

Robert D. Cameron. Perl Style Regular Expressions in Prolog. CMPT 384 Lecture Notes, Nov. 29-Dec. 1, 1999 http://www.cs.sfu.ca/~cameron/Teaching/384/99-3/regexp-plg.html. Last accessed Sep. 25, 2007.

* cited by examiner

*Primary Examiner*—Greta L Robinson
*Assistant Examiner*—James J Wilcox
(74) *Attorney, Agent, or Firm*—Turocy & Watson, LLP

(57) ABSTRACT

A mechanism is provided to facilitate complex textual pattern matching. Regular expressions are specified utilizing a set of rules of various simplicity/complexity. These rules are subsequently employed to generate a more complex regular expression described by the rules, which can be passed to a regular expression engine to identity textual patterns as a function thereof.

14 Claims, 10 Drawing Sheets

COMPLEX REGULAR EXPRESSION CONSTRUCTION

BACKGROUND

Regular expressions, or more generally patterns, describe sets of character strings. The pattern determines character strings that belong to the set. Accordingly, patterns can be employed to identify character strings, for example, to select specific strings from a set of character strings. Furthermore, regular expressions are often defined as a context-independent syntax that can represent a wide variety of character sets and character set orderings.

In operation, regular expressions can be employed to search and match data as a function of a predefined pattern or set of patterns. As such, patterns employ a specific syntax by which particular characters or strings are selected from a body of text. More specifically, the expressions can consist of constants and operators that denote sets of strings and operations over these sets, respectively. Using the specific syntax of a regular expression or other pattern language, advanced text pattern matching can be performed. Table 1 that follows lists exemplary regular expression operators and their definitions. The syntax illustrated in the table is frequently employed to establish both simple and complex string pattern identifications.

TABLE 1

| Character | Definition |
|---|---|
| . | Matches any single character. |
| [ ] | Matches any single character from within the bracketed list. Within square brackets, most characters are interpreted literally. |
| [^ ] | Specifies a set of characters not to be matched. |
| | Matches the beginning of a line. |
| $ | Matches the end of a line. |
| \| | Matches either the regular expression preceding it or the regular expression following it. |
| ( ) | Groups one or more regular expressions to establish a logical regular expression consisting of sub-regular expressions. Used to override the standard precedence of certain operators. |
| ? | Specifies that the preceding regular expression is matched 0 or 1 time. |
| * | Specifies that the preceding regular expression is matched 0 or more times. |
| + | Specifies that the preceding regular expression is matched 1 or more times. |
| {n} | Specifies that the preceding regular expression is matched exactly "n" number of times. |
| {n,} | Specifies that the preceding regular expression is matched "n" or more times. |
| {, n} | Specifies that the preceding regular expression is matched "n" or fewer times. |
| {n, m} | Specifies that the preceding regular expression is matched a maximum of "n" times and a minimum of "m" times. If not specified, "m" defaults to "0." If "n" is not specified, the default depends on whether the comma is present. If no comma is present, "n" defaults to "m." If a comma is present, "n" defaults to a very large number. |
| \n | Matches a new line. |
| \t | Matches a tab character. |

Regular expressions are a useful tool many areas. For example, regular expressions are utilized by compilers to identify tokens and otherwise translate computer-programming code. Similarly, code completion and/or highlighting systems utilize regular expressions in integrated development environments. Regular expressions are also useful in the data flow field, which pertains to the movement and transformation of data to and amongst storage mediums.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to regular expressions and construction thereof. Regular expressions are a powerful way to search for patterns within text streams. However, complex patterns such as those associated with constructs of programming languages can be overly burdensome, if not nearly impossible, for programmers to specify directly.

In accordance with an aspect of the disclosed subject matter a mechanism is provided allow complex patterns to be composed of a plurality of simpler patterns. More specifically, complex regular expressions can be generated automatically as a function of a collection of simpler rules. Subsequently, a regular expression engine can be fed the regular expression to enable pattern matching based thereon.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided with respect to facilitating pattern matching utilizing regular expressions. Rather than forcing users to attempt to specify complex regular expressions directly, they can be composed utilizing a set of simpler rules. These rules can then be transformed to a complex regular expression automatically removing the burden from users. Subsequently, the regular expression can be provided to a regular expression engine for matching against a set of textual data.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
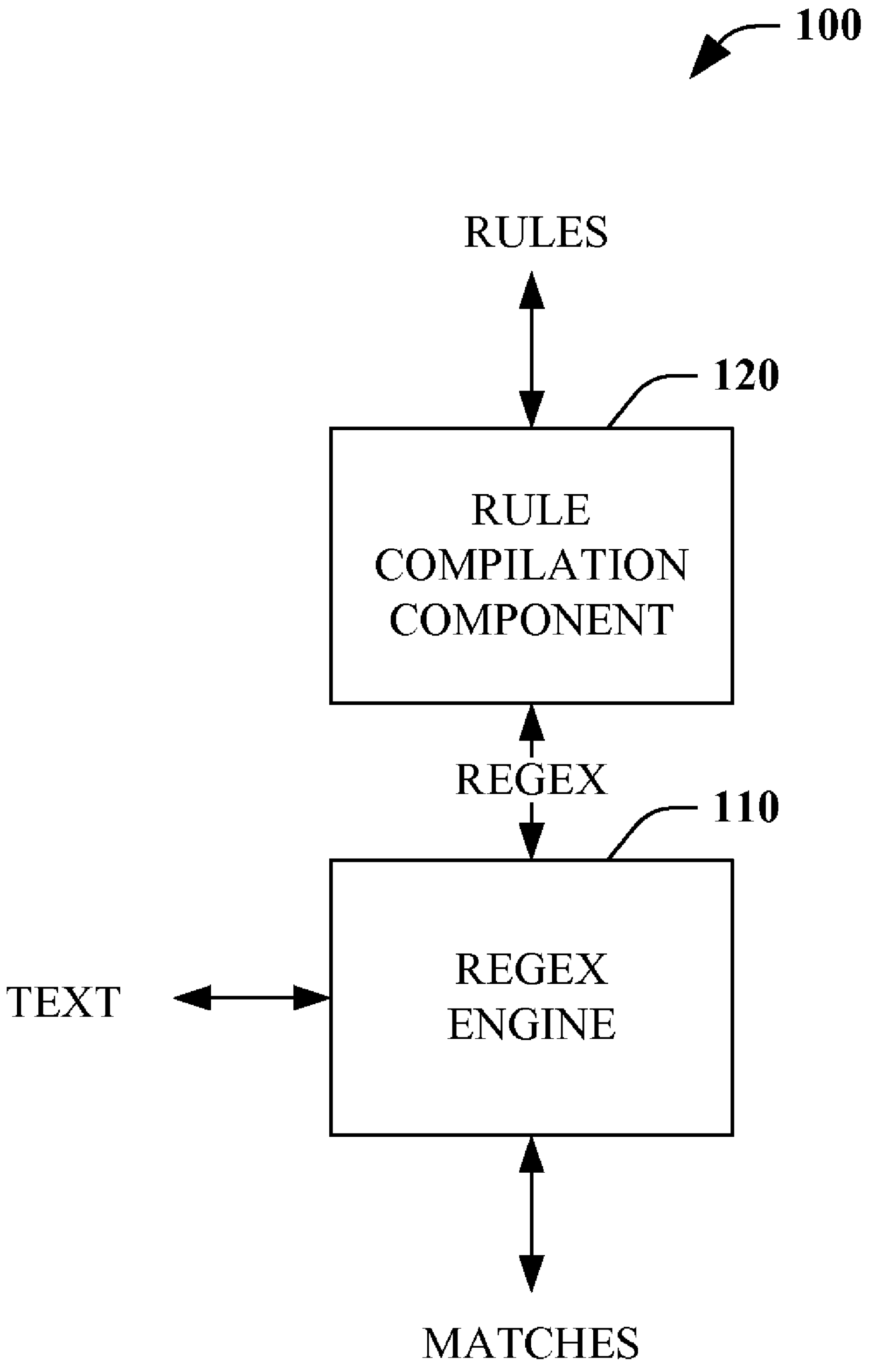
FIG. 1 is a block diagram of a system of pattern matching in accordance with an aspect of the disclosed subject matter.

Referring initially to FIG. 1, a pattern matching system 100 is illustrated in accordance with an aspect of the claimed subject matter. More specifically, the system 100 can aid textual pattern matching utilizing regular expressions via regular expression (regex) engine 110 and communicatively coupled rule compilation component 120.

The regex engine 110 provides textual pattern matching as a function of an input regular expression. The regex engine 110 can be either a text-directed engine or a regex-directed engine, wherein a text-directed engine is a deterministic finite automation (DFA) and a regex-directed engine is a non-deterministic finite automation (NFA). In either instance, the regex engine 110 receives, retrieves, or otherwise obtains as input a regular expression and a string of textual data for which to identify matches. Regular expressions comprise a plurality of normal characters and operators that describe a set of one or more strings in the form of an expression or pattern. The regex engine 110 utilizes the regular expression to process input text. By way of example, consider an overly simplified scenario where the input text is a string "exemplary test string" and the pattern corresponds to "test." In this case, the regex engine 110 will search the string incrementally (e.g., "e," "x," "e," "m," "p," "l," "a," "r," "y") until it finds the first letter "t." Subsequently, the engine will look for the remaining letters "est" to ultimately match the pattern.

In practice regular expressions can be quite complex. Moreover, programmers are conventionally responsible for direct specification of regular expressions. Specifying complex patterns such as constructs of a programming language is thus nearly impossible. The rule compilation component 120 provides a solution to this dilemma.

As input, the rule compilation component 120 receives, retrieves or otherwise obtains or acquires rules. Rather than requiring direct specification, complex regular expressions can be provided as a set or collection of simpler rules. In one instance, each rule can comprise a name definition pair. Furthermore, higher-level rules can be defined in terms of lower-level or primitive rules. The rule compilation component 120 produces a regular expression based on the specified rules. Subsequently, this generated regular expression can be provided as input to the regex engine 110.

While the regex engine 110 and rule compilation component 120 can be combined, in accordance with one aspect of the claim subject matter these components are independent. There are many benefits of separating the components and interests thereof. For example, regular expressions can still be generated without requiring specification of rules. In addition, a new engine need not be generated. The rule compilation component 120 can simply interact with conventional regex engines. Furthermore, conventional regular expression based systems need not be re-written to produce rules rather than regular expressions, for instance.

Figure 2:
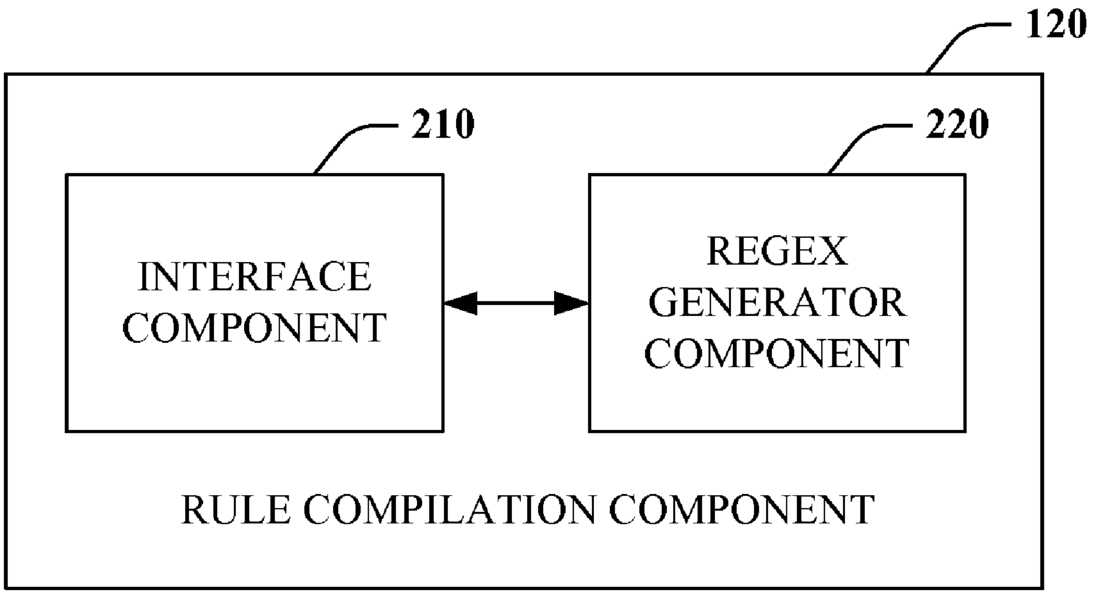
FIG. 2 is a block diagram of a representative rule compilation component in accordance with an aspect of the disclosure.

Turning attention to FIG. 2, a representative rule compilation component 120 is depicted in accordance with an aspect of the claimed subject matter. As illustrated, the rule compilation component 120 includes an interface component 210 and regex generator component 220. The interface component 210 provides a mechanism for receiving, retrieving or otherwise obtaining a set of rules from an individual, entity, and/or other component. These rules can be specified in accordance with a particular grammar associated with the rules. For example, each rule can include a name and a definition in accordance with a particular syntax. Furthermore, the rules can be specified such that higher-level rules (e.g., non-terminal) are specified based on lower-level or primitive rules (e.g., terminal).

The rules acquired by the interface component 210 can subsequently be provided or made accessible to the regex generator component 220. From such rules, as the name suggests, the regex generator component 220 can generate a regular expression. Although not limited thereto, according to one aspect, rules can be an extension of the regular extension language. As a result, a resulting regular expression can be generated by compiling individual regex rules into a single regular expression.

Figure 3:
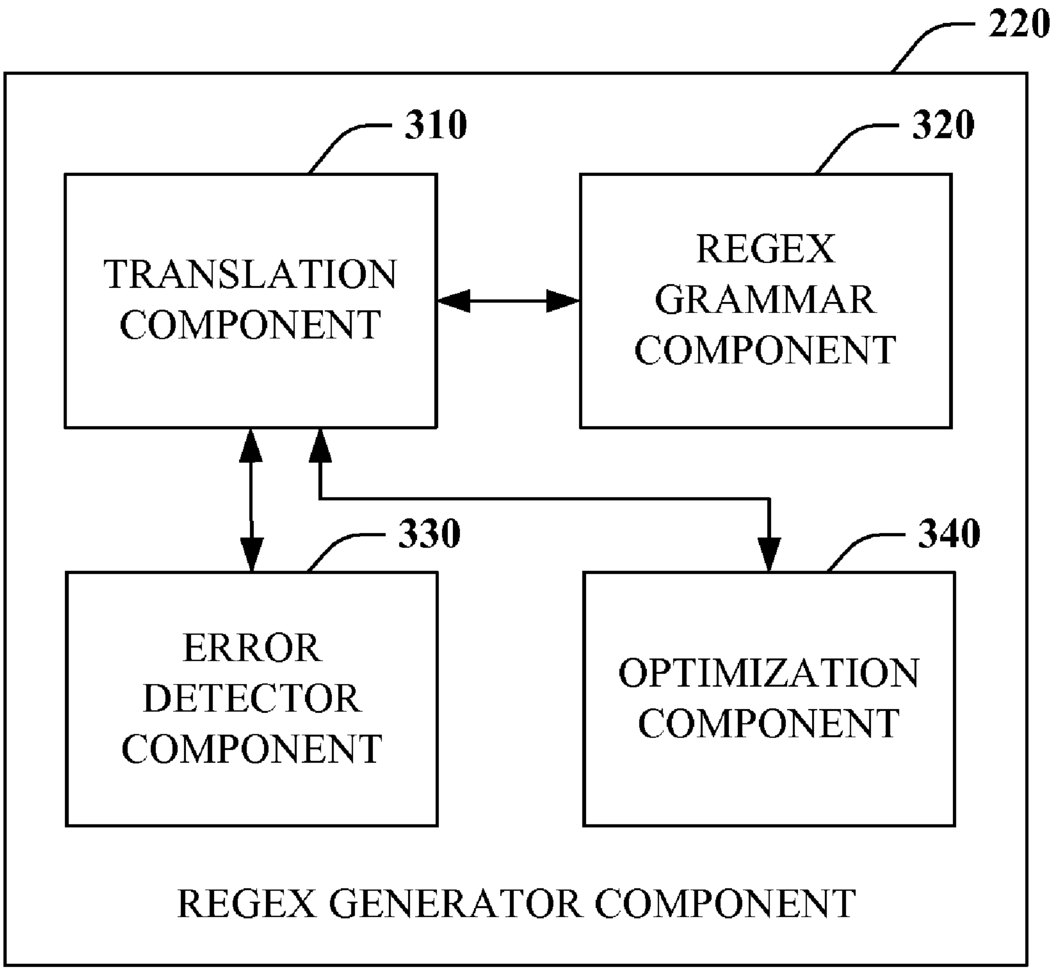
FIG. 3 is a block diagram of a representative regex generation component according to an aspect of the disclosed subject matter.

FIG. 3 illustrates a representative regex generator component 220 in accordance with an aspect of the disclosed subject matter. As shown, the regex generator component 220 includes a translator component 310 and a regex grammar component 320. The translator component 310 translates specified rules to a regular expression utilizing the regex grammar component 320. In other words, the translator component 310 maps rules to regular expression constructs provided by its grammar. In essence this can correspond to a rule to regular expression grammar mapping. In one implementation, the translation component 310 can recursively locate non-terminal rule representations and convert them into terminal representations to construct a large terminal regular expression.

The translation component 310 can also interact with error detection component 330 to facilitate identification or rule errors. For instance, the error detection component 330 can detect circular rules or missing definitions. Upon detection, an exception, error message, and/or other like can be produced.

Further yet, optimization component 340 can be employed by the translation component 310 to facilitate optimized translation of rules to regular expressions. In one instance, the optimization component 340 can ensure that a non-terminal representation is computed at most once. Other optimizations are also possible and are to be considered within the scope of the subject disclosure. For example, various caching schemes (e.g., deferred loading, eager loading . . . ) can be employed to facilitate processing of rules and generation of regular expressions.

To facilitate clarity and understanding, consider a scenario in which a new language is developed and one needs to parse a script of multiple statements. Conventionally, a language parser would have to be coded since a regular expression mechanism would be nearly impossible to generate for a language. Now, however, it is possible to generate and employ a complex regular expression by specifying some rules.

By way of example and not limitation, Appendix A provides a tabular overview of a sample language to be parsed. In sum, the desire is to parse a script of a language with the following characteristics:

- The script is a sequence of statements terminated by semicolon (;).
- A statement may be a declaration or executable. That is determined by the leading keyword of the statement.
- A statement may contain complex identifiers enclosed in square brackets ([ . . . ]). Any character within the square brackets is part of the identifier. If a closing square bracket (]) should be part of an identifier, it should be doubled (]]).
- A statement may include string literals enclosed in single quotes (' . . . '). Any character within the single quotes is part of the literal. If a single quote (') should be part of a literal, it should be doubled ('').
- There might be comments anywhere in the script. There are two types of comments:
  - Line comments—They start with a double dash (—) and finish at the end of the line.
  - Block comments—They start with slash-star (/*) and end with star-slash (*/).

The goal is to be able to traverse sequentially the statements from a given script correctly. The difficulty is to correctly detect the boundaries of comments, literals, identifiers, and statements, that is to ignore semicolons (;) within literals, single quotes (') within identifiers, opening square brackets within comments, etc. In order to correctly extract individual statements from such a language script the following rules can be specified:

```
(?<Script>\s*(\K<Comment>|\K<Statement>)*),
(?<Statement>(\K<Literal>|\K<StatementHead>(\K<StatementChunk>)*)\s*),
(?<StatementChunk>(\K<Comment>|\K<Identifier>|\K<Literal>|\K<StatementText>)
),
(?<StatementHead>(\K<StatementHeadChar>)+),
(?<StatementHeadChar>[^\s\[\]“‘”;/–]|/[^\*]|–[^–]),
(?<StatementText>(\K<StatementChar>)*),
(?<StatementChar>[^\[\]“‘”;/–]|/[^\*]|–[^–]),
(?<Comment>\K<BlockComment>|\K<LineComment>),
(?<BlockComment>/\*\K<BlockCommentChar>*\*/),
(?<BlockCommentChar>[^\*]|\*[^/]),
(?<LineComment>––.*),
(?<Identifier>\[\K<IdentifierChar>*\]),
(?<IdentifierChar>\[{2}|\]{2}|[^\[\]]),
(?<Literal>\K<SingleQuoteLiteral>|\K<DoubleQuoteLiteral>),
(?<SingleQuoteLiteral>‘\K<SingleQuoteLiteralChar>*’),
(?<SingleQuoteLiteralChar>‘{2}|[^’]),
(?<DoubleQuoteLiteral>“‘\K<DoubleQuoteLiteralChar>*’”),
(?<DoubleQuoteLiteralChar>“‘{2}|[^’”])
```

Here, rules are specified as name definition pairs delineated by triangle brackets and parenthesizes in accordance with the exemplary rule grammar. From these eighteen grammar rules, the following regular expression can be generated by the regex generation component 220 that correctly matches each statement:

```
(?<Script>((?<Identifier>\[(?<IdentifierChar>\[{2}|\]{2}|[^\[\]])*\])|(?<Literal>‘(?<LiteralChar>‘
{2}|[^’])*’)|(?<Comment>(?<BlockComment>/\*[\s\S]*\*/)|(?<LineComment>––.*))|
(?<Statement>(?<StatementHead>\w+)((?<StatementChunk>((?<Comment>
(?<BlockComment>/\*[\s\S]*\*/)|(?<LineComment>––.*))|(?<Identifier>\[(?<IdentifierChar>\
[{2}|\]{2}|[^\[\]])*\])|(?<Literal>‘(?<LiteralChar>‘{2}|[^’])*’)|(?<StatementText>
((?<StatementChar>[^\[\]’;]))*))))*\s*))*)
```

This exemplary implementation utilizes an extension to the regular expression language that adds a minimum amount of new syntax. For instance, to refer to a non-terminal symbol, "\K" (capital "k") is employed. That is similar to "\k" (lowercase “k”) which is used for backward reference. Then each rule is a standard named group pattern.

The same mechanism can also be utilized for different reasons with a different set of rules. For example, color coding and intelligent assistance can be specified in this manner. In this case, the each type of word in a script can extracted to enable rending a proper color. Below is a sample set of grammar rules that can be specified to facilitate generation of an appropriate regular expression to effect such functionality with respect to the previously described exemplary language.

```
(?<Script>(\K<Keyword>|\K<Identifier>|\K<Literal>|\K<Comment>)*),
(?<Keyword>\w+),
(?<Comment>\K<BlockComment>|\K<LineComment>),
(?<BlockComment>/\*\K<BlockCommentChar>*\*/),
(?<BlockCommentChar>[^\*]|\*[^/]),
(?<LineComment>--.*),
(?<Identifier>\[\K<IdentifierChar>*\]),
(?<IdentifierChar>\[{2}|\]{2}|[^\[\]]),
(?<Literal>\K<SingleQuoteLiteral>|\K<DoubleQuoteLiteral>),
(?<SingleQuoteLiteral>‘\K<SingleQuoteLiteralChar>*’),
(?<SingleQuoteLiteralChar>‘{2}|[^’]),
(?<DoubleQuoteLiteral>““\K<DoubleQuoteLiteralChar>*””),
(?<DoubleQuoteLiteralChar>““{2}|[^””])
```

Here, only thirteen rules need be specified and no code written.

Figure 4:
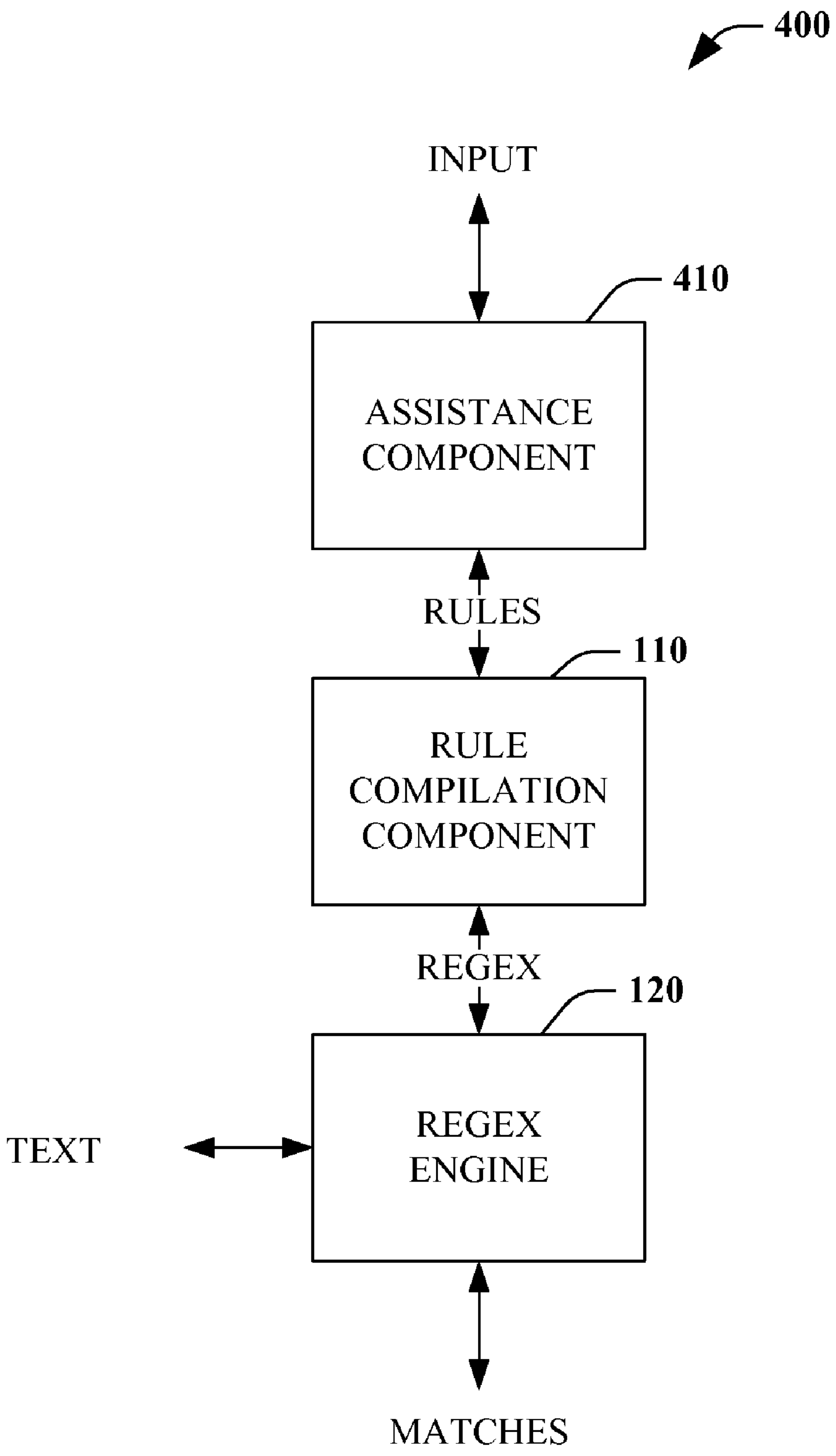
FIG. 4 is a block diagram of a pattern matching system in accordance with an aspect of the disclosed subject matter.
Figure 5:
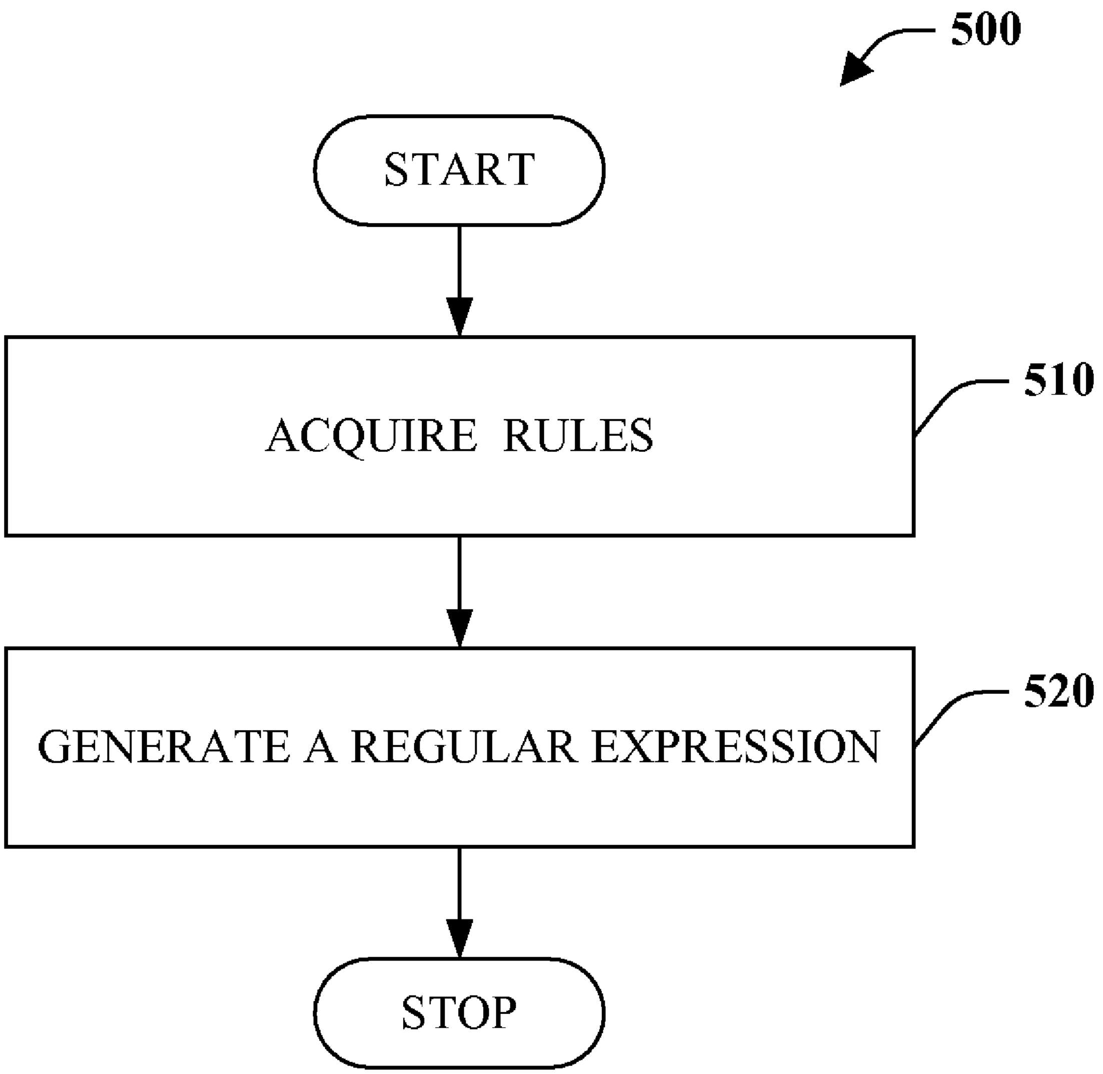
FIG. 5 is a flow chart diagram of a regular expression method according to an aspect of the disclosed subject matter.

Referring to FIG. 4, a pattern matching system 400 is depicted in accordance with an aspect of the claimed subject matter. Similar to system 100 of FIG. 1, the system 400 includes the regex engine 110 and rule compilation component 120, as previously described. In brief, the regex engine 110 receives regular expressions generated by the rule compilation component 120 to facilitate matching of textual strings. Moreover, the rule compilation component 120 is operable to receive a set of rules and generate a regular expression as a function thereof. This relieves programmers of the burden of attempting to directly code complex regular expressions, for instance.

System 400 further includes assistance component 410 to aid specification of rules. The assistance component 410 adds yet another layer on top of the rule compilation component 120 to assist generation of regular expressions. For example, assistance component 410 can provide automatic completion functionality via suggestions, drop-down menus and/or the like based on current rule specification and/or regular expression grammar, among other things. The assistance component can also provide color-coding to aid rule specification and/or error detection. In one embodiment, the assistance component 410 can be an integrated development environment (IDE) and/or code editor plug-in or add-on to support development of rules.

Additionally or alternatively, it should be appreciated that the assistance component 410 can enable automatic generation of rules. For example, a wizard can be provided to acquire information from a user that the assistance component 410 can utilize to infer a set of rules. Further yet, the assistance component 410 can also interpret and/or utilize alternate representations of language grammars such as BNF (Backus-Naur Form) to help infer rules relating to parsing and/or color-coding a related language, among other things.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the assistance component 410 can utilize such mechanisms to infer aid such as suggestions of automatic statement completion as a function of current rule specification, the regular expression grammar, and/or a target language grammar.

In view of the exemplary systems described sura, methodologies that may be implemented in accordance with the disclosed subject matter will be better appreciated with reference to the flow charts of FIGS. 5-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

The same mechanism can also be utilized for different reasons with a different set of rules. For example, color coding and intelligent assistance can be specified in this manner. In this case, the (e.g., each type of word in a script can be extracted to enable rendering a proper color. Below is a sample set of grammar rules that can be specified to facilitate generation of an appropriate regular expression to effect such functionality with respect to the previously described exemplary language.

Figure 6:
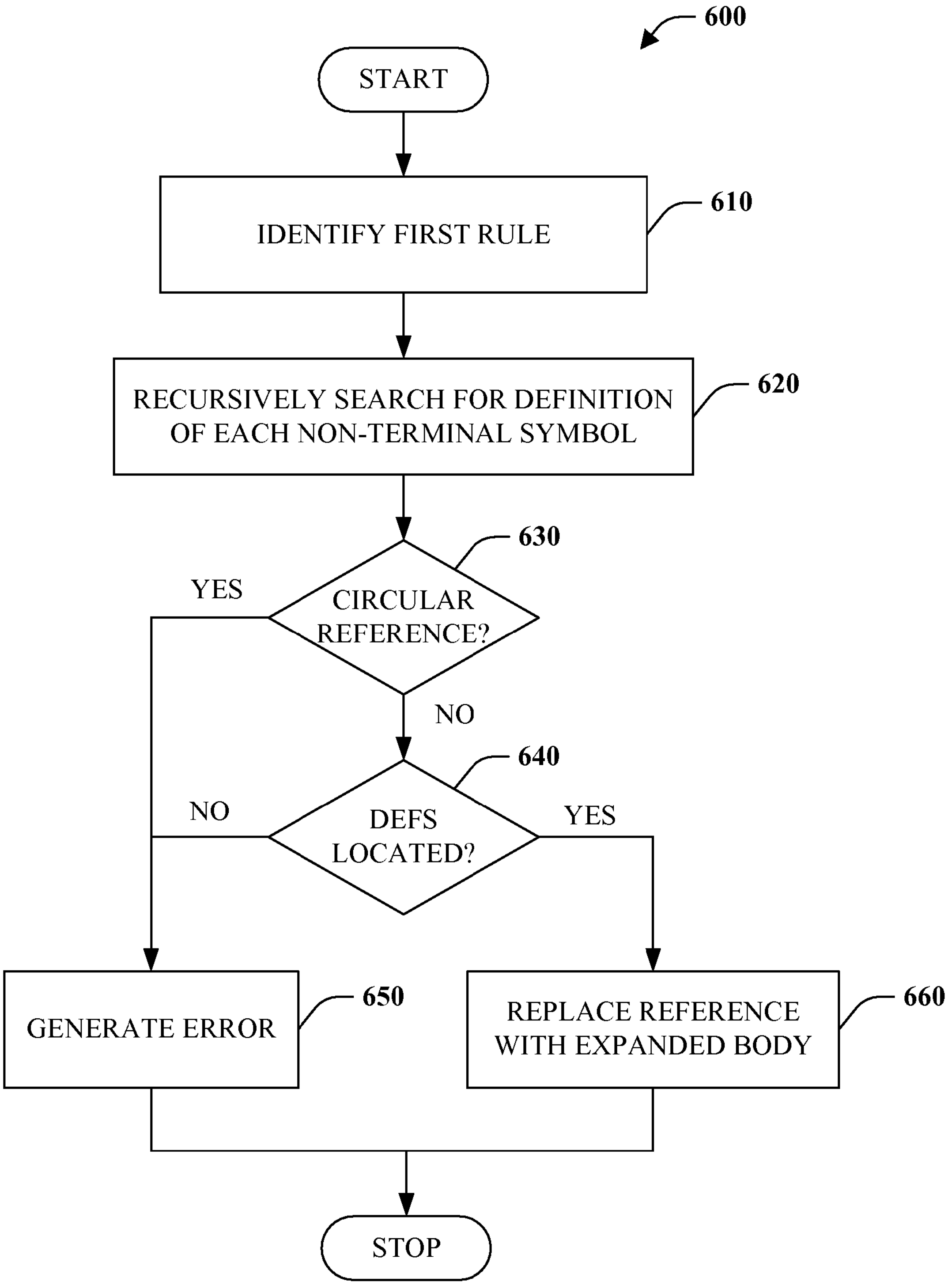
FIG. 6 is a flow chart diagram of regular expression generation method in accordance with an aspect of the disclosed subject matter.

FIG. 6 illustrates a method of regular expression generation 600 in accordance with an aspect of the claimed subject matter. As previously mentioned regular expression can be automatically generated as a function of a collection of rules rather than attempting to hard code a regular expression directly. At reference numeral 610, the first rule is acquired. At numeral 620, the definition of each non-terminal element in the rule symbol is searched for recursively. At reference 630, a determination is made concerning whether a circular reference has been detected. If yes, the method proceeds to numeral 650 where an error is generated. If no, the method continues at 640 where another determination is made as to whether a definition is missing. If a definition is missing making it impossible to generate the regular expression, for instance, the method again proceeds to numeral 650 where an error is produced. If there are no circular definitions at 630 and no missing definitions at 650, the method continues at 660 where each reference is replaced with an expanded body until the final terminal regular expression is constructed.

Figure 7:
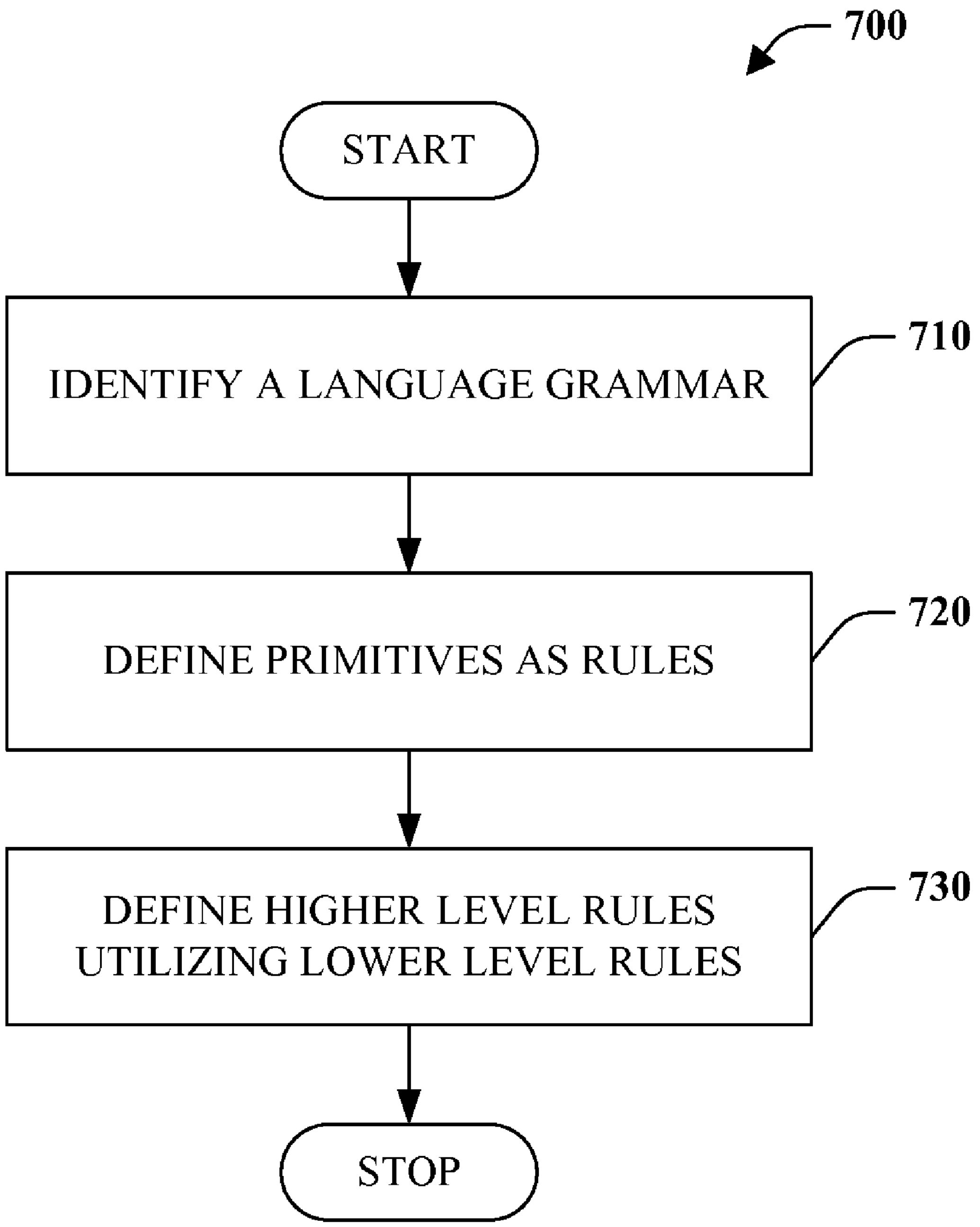
FIG. 7 is a flow chart diagram of method of generating rules according to an aspect of the disclosed subject matter.

Turning to FIG. 7, a method of rule generation 700 is depicted according to an aspect of the claimed subject matter. At reference numeral 710, a language grammar is identified. For example, the language can be a programming language for which a regular expression is to be generated to enable parsing and/or matching of patterns. At numeral 720, the language primitives are defined as rules, for instance as name definition tuples. In one embodiment, the rules can be defined as named group patterns utilizing the regular expression language. At reference 730, higher-level rules are defined as a function of lower level rules. The granularity of specificity or complexity can vary based on user or system ability and/or comfort level. For instance, a user can specify a complex rule or break the rule down into a number of simpler rules.

Figure 8:
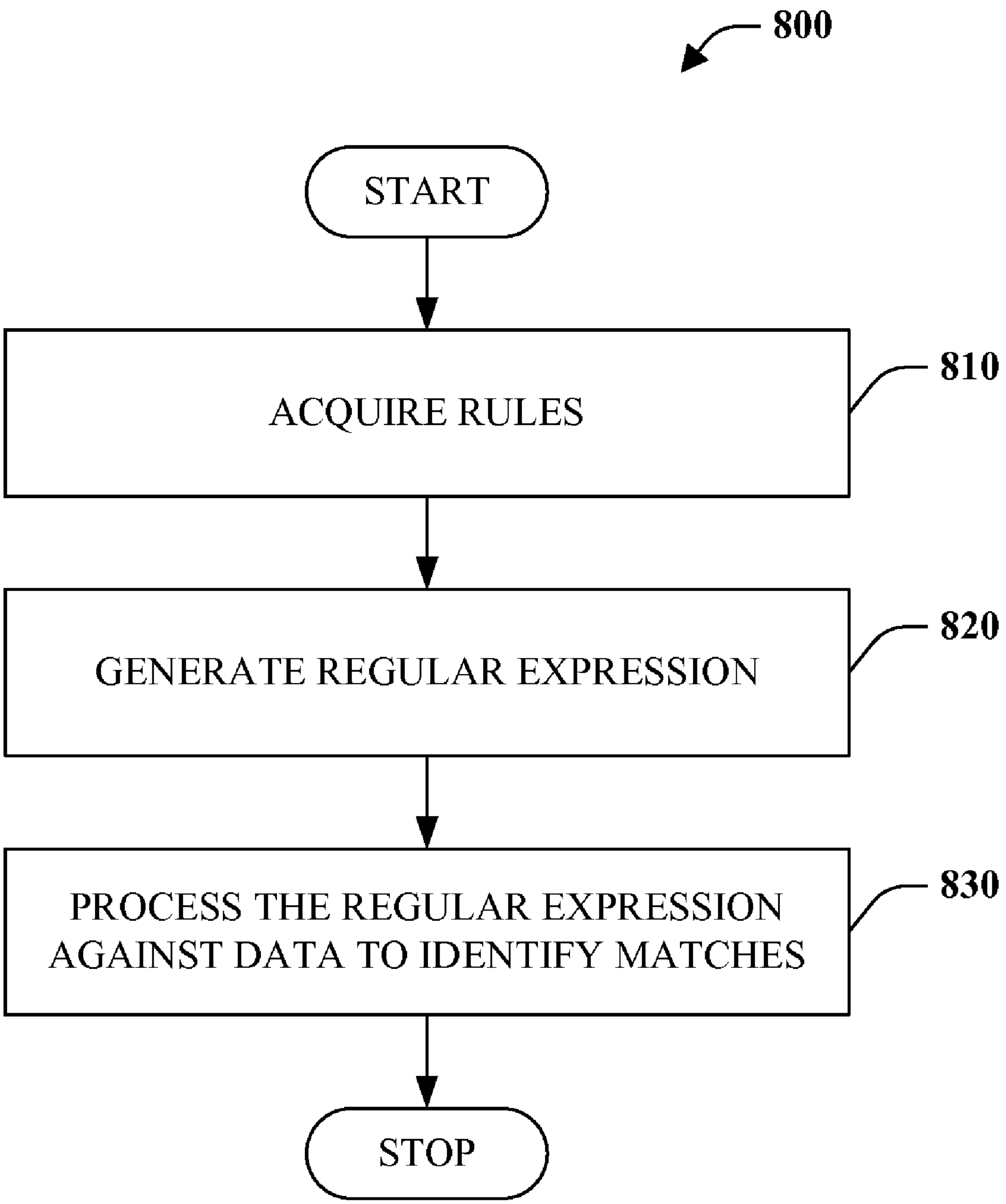
FIG. 8 is a flow chart diagram of a pattern matching method in accordance with an aspect of the disclosed subject matter.

FIG. 8 is a flow chart diagram of a method of pattern matching 800 in accordance with an aspect of the claimed subject matter. At reference numeral 810, a set of rules is acquired. In one instance, the rules can be provided as a plurality of user specified name definition pairs in which higher-level rules are designated as a function of lower level rules. A regular expression is generated from the set of rules at numeral 820 for example by recursively locating and computing a terminal representation of each non-terminal rule until a final terminal regular expression results. At reference numeral 830, the regular expression is processed against data to identify matches. In case, this can be accomplished by feeding the generated regular expression to a conventional regex engine.

Method 800 can be employed in a plurality of situations. For example, the method can be utilized with respect to compiler features and/or functionality including identification of tokens and translation thereof at compile time and provisioning of design time assistance such as color-coding, formatting, automatic code completion and/or error detection. Further, yet the method 800 can be employed with respect to other conventional and/or unconventional regular expression uses including data flow technologies, among other things.

As used herein, the terms “component,” “system,” “engine,” and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word “exemplary” or various forms thereof are used herein to mean serving as an example, instance, or illustration. Any aspect or design described herein as “exemplary” is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term “inference” or “infer” refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term “article of manufacture” as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
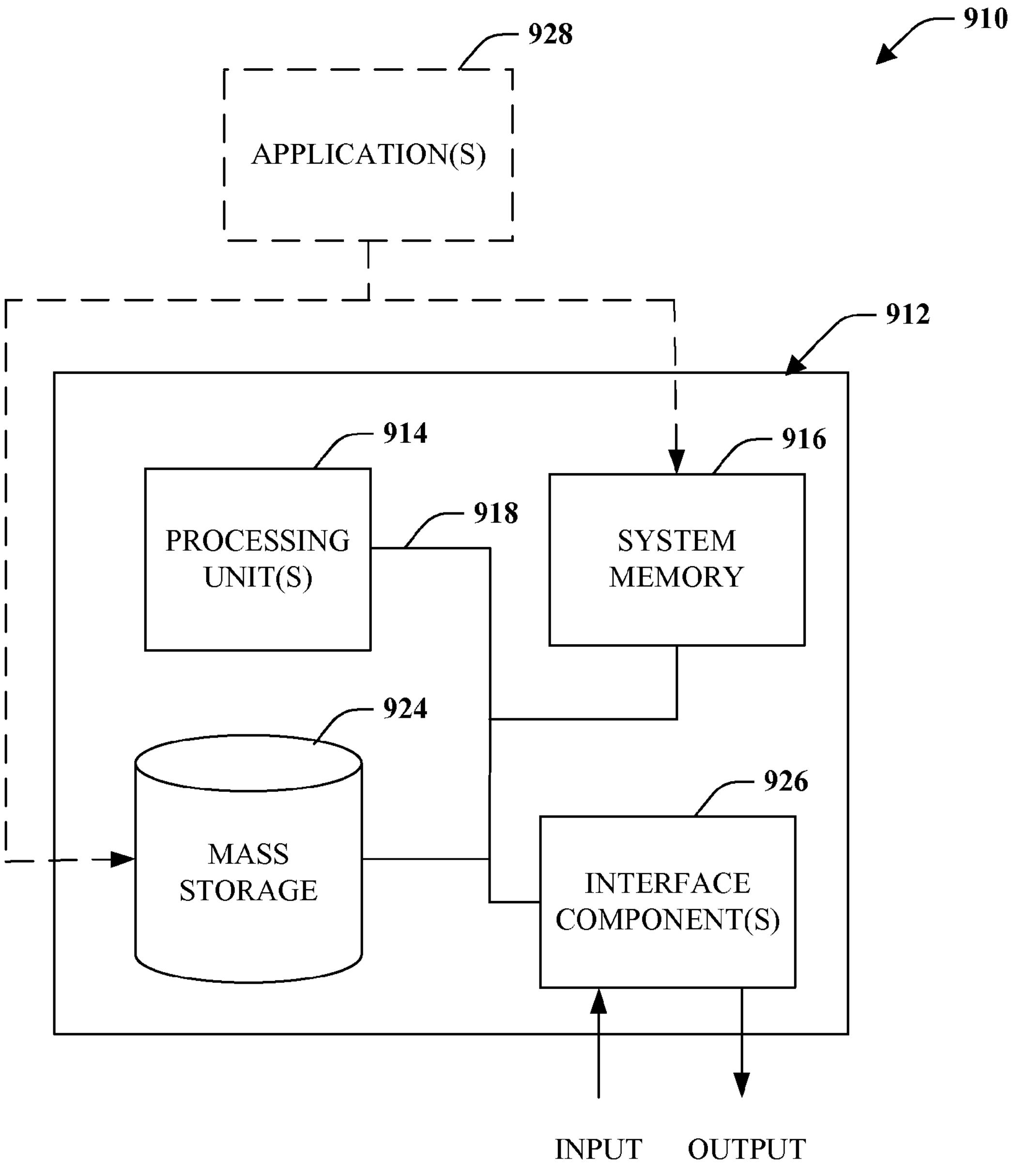
FIG. 9 is a schematic block diagram illustrating a suitable operating environment for aspects of the subject disclosure.
Figure 10:
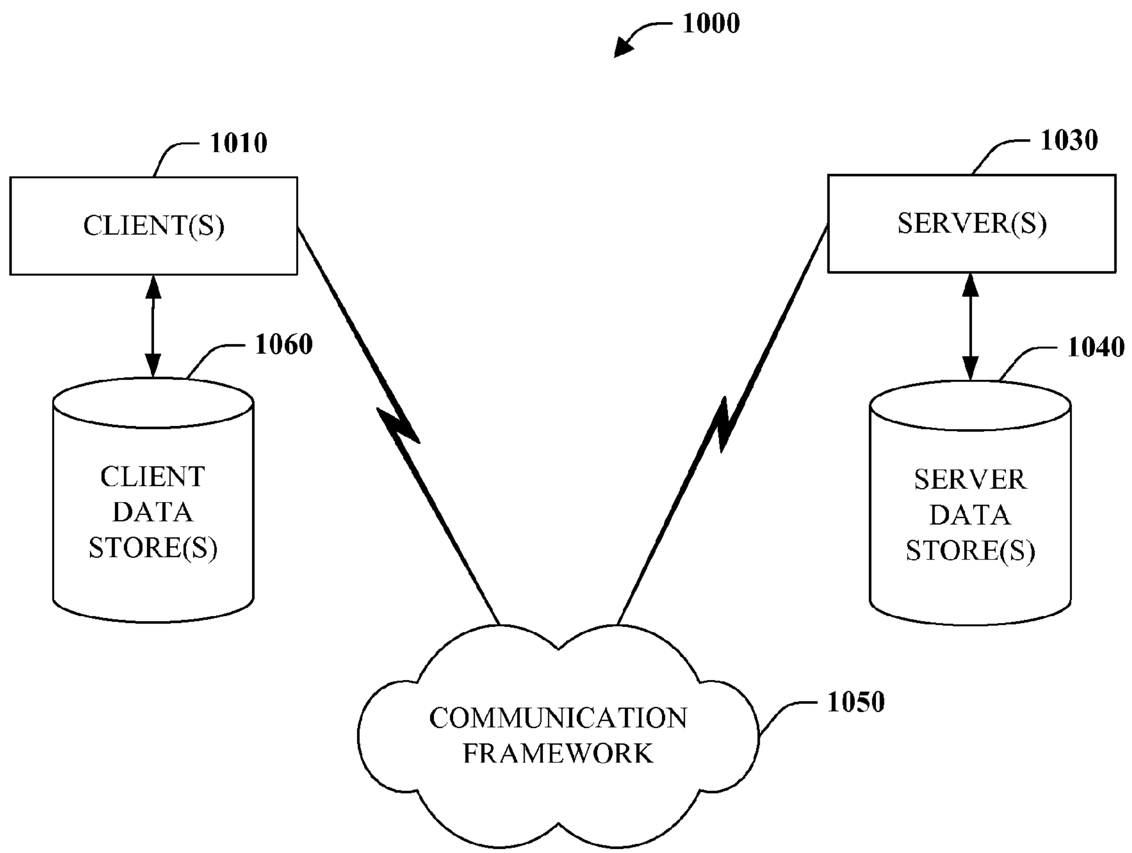
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916, and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory, or memory stick. In addition, mass storage 924 can include storage media separately or in combination with other storage media.

FIG. 9 provides software application(s) 928 that act as an intermediary between users and/or other computers and the basic computer resources described in suitable operating environment 910. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example and not limitation, the functionality of the rule compilation component 120 and/or assistance component 410 can be provided as a web service supplied by one or more servers 1030 to one or more requesting clients 1010 over the communication framework 1050. Thus, programmers could utilize the service to generate rules or simply provide rules to the service and receive a regular expression in return. Additionally or alternatively, such components can be downloaded from server(s) 1030 to client(s) 1010 utilizing communication framework 1050 to facilitate local storage and/or execution.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

| Literals | Value |
|---|---|
| "abc" | abc |
| 'abc' | abc |
| 1 | 1 |
| {2} | 2 |
| {3, 4, 5} | 3 |
| | 4 |
| | 5 |

| Rows | | |
|---|---|---|
| ROW(1 AS i, 'abc' AS s) | i | s |
| | 1 | abc |
| SELECT ROW(1 AS i, 'abc' AS s) AS Row | Row | |
| FROM {11, 12, 13}; | i | s |
| | 1 | abc |
| | i | s |
| | 1 | abc |
| | i | s |
| | 1 | abc |
| {ROW(1 AS i, 'abc' AS s)} | i | s |
| UNION ALL | 1 | abc |
| {ROW(2, 'xyz')}; | 2 | xyz |

| Entities | | | | |
|---|---|---|---|---|
| | c | | | |
| SELECT c FROM AdventureWorks.Culture AS c WHERE c.CultureID IN {‘en’, ‘es’, ‘fr’}; | CultureID | Name | ModifiedDate | |
| | en | English | 6/1/1998 12:00:00 AM | |
| | CultureID | Name | ModifiedDate | |
| | es | Spanish | 6/1/1998 12:00:00 AM | |
| | CultureID | Name | ModifiedDate | |
| | fr | French | 6/1/1998 12:00:00 AM | |
| SELECT VALUE c FROM AdventureWorks.Culture AS c WHERE c.CultureID IN {‘en’, ‘es’, ‘fr’}; | CultureID | Name | ModifiedDate | |
| | en | English | 6/1/1998 12:00:00 AM | |
| | es | Spanish | 6/1/1998 12:00:00 AM | |
| | fr | French | 6/1/1998 12:00:00 AM | |
| AdventureWorks.Department( CAST(100 AS Edm.Int16), ‘Dyn. Dept’, ‘Dyn. Group’, Edm.GetDate( )); | Department ID | Name | GroupName | ModifiedDate |
| | 100 | Dyn. Dept | Dyn. Group | 6/20/2007 3:52:47 PM |

| Functions | ContactID | FirstNameLength | LastNameLength | EmailAddressLength |
|---|---|---|---|---|
| SELECT c.ContactID, -- Canonical: Length(c.FirstName) AS FirstNameLength, -- Canonical: Edm.Length(c.LastName) AS LastNameLength, -- Provider-specific: SqlServer.LEN(c.EmailAddress) AS EmailAddressLength FROM AdventureWorks.Contact AS c WHERE c.ContactID BETWEEN 10 AND 12; | 10 | 6 | 5 | 27 |
| | 11 | 6 | 8 | 27 |
| | 12 | 5 | 7 | 26 |

| Keys/References | | | |
|---|---|---|---|
| SELECT VALUE KEY(c) FROM AdventureWorks.Culture AS c WHERE c.CultureID IN {‘en’, ‘es’, ‘fr’}; | CultureID | | |
| | en | | |
| | es | | |
| | fr | | |
| SELECT VALUE REF(c) FROM AdventureWorks.Culture AS c WHERE c.CultureID IN {‘en’, ‘es’, ‘fr’}; | C1 | CultureID | |
| | 0 | en | |
| | 0 | es | |
| | 0 | fr | |
| SELECT VALUE DEREF(REF(c)) FROM AdventureWorks.Culture AS c WHERE c.CultureID IN {‘en’, ‘es’, ‘fr’}; | CultureID | Name | ModifiedDate |
| | en | English | 6/1/1998 12:00:00 AM |
| | es | Spanish | 6/1/1998 12:00:00 AM |
| | fr | French | 6/1/1998 12:00:00 AM |

Navigation + Nesting

| Query | EmployeeID | FirstName | LastName | EmployeePayHistory<br>RateChange Date | Rate |
|---|---|---|---|---|---|
| SELECT e.EmployeeID,<br>-- to 1:<br>e.Contact.FirstName,<br>e.Contact.LastName,<br>-- to many:<br>(SELECT<br>eph.RateChangeDate, eph.Rate<br>FROM<br>e.EmployeePayHistory AS eph) AS<br>PayHistory<br>FROM AdventureWorks.Employee<br>AS e<br>WHERE e.EmployeeID IN {4, 6}; | 4 | Rob | Walters | 1/5/1998 12:00:00 AM | 8.6200 |
| | | | | 7/1/2000 12:00:00 AM | 23.7200 |
| | | | | 1/15/2002 12:00:00 AM | 29.8462 |
| | | | | RateChange Date | Rate |
| | 6 | David | Bradley | 1/20/1998 12:00:00 AM | 24.0000 |
| | | | | 8/16/1999 12:00:00 AM | 28.7500 |
| | | | | 6/1/2002 12:00:00 AM | 37.5000 |

Paging/TOP

| Query | ContactID | FirstName | LastName |
|---|---|---|---|
| SELECT TOP(3) c.ContactID, c.FirstName,<br>c.LastName<br>FROM AdventureWorks.Contact AS c<br>WHERE c.ContactID >= 10; | 10 | Ronald | Adina |
| | 11 | Samuel | Agcaoili |
| | 12 | James | Aguilar |
| SELECT c.ContactID, c.FirstName,<br>c.LastName<br>FROM AdventureWorks.Contact AS c<br>ORDER BY c.ContactID<br>SKIP 9 LIMIT 3; | ContactID | FirstName | LastName |
| | 10 | Ronald | Adina |
| | 11 | Samuel | Agcaoili |
| | 12 | James | Aguilar |

Grouping

| Query | FirstName | LastName | PayChanges |
|---|---|---|---|
| SELECT c.FirstName, c.LastName,<br>epc.PayChanges<br>FROM<br>(SELECT eph.EmployeeID,<br>Count(eph.EmployeeID) AS<br>PayChanges<br>FROM<br>AdventureWorks.EmployeePayHistory AS eph<br>GROUP BY eph.EmployeeID<br>HAVING Count(eph.EmployeeID)<br>>= 3) AS epc<br>JOIN AdventureWorks.Contact AS c<br>ON epc.EmployeeID = c.ContactID; | Humberto | Acevedo | 3 |
| | Frances | Adams | 3 |
| | Sean | Jacobson | 3 |
| | Adam | Barr | 3 |
| | Mary | Billstrom | 3 |
| | Cornelius | Brandon | 3 |
| | Shirley | Bruner | 3 |
| | Megan | Burke | 3 |
| | Stephen | Burton | 3 |
| | Jovita | Carmody | 3 |
| | Matthew | Cavallari | 3 |
| | Charles | Christensen | 3 |
| | Bart | Duncan | 3 |

What is claimed is:

1. A regular expression system, comprising at least one processor coupled to at least one machine-readable storage medium storing instructions executable by the at least one processor to implement:

a rule compilation component configured to receive a specification of primitive rules and to generate a complex regular expression based on the specification of primitive rules, and to detect at least a circular reference and a missing definition;

a regular expression engine configured to receive the complex regular expression and textual data, and to compare the textual data to the complex regular expression to obtain matching data;

wherein the rule compilation component includes a regular expression grammar component, and a translator component configured to translate the specification of primitive rules, based on a grammar provided by the regular expression grammar component, into the complex regular expression, by recursively locating non-terminal rule representations and converting the non-terminal rule representations into the complex regular expression, the complex regular expression being a terminal regular expression; and an assistance component configured to at least one of interpret or utilize an alternate representation of a language grammar, to infer a rule relating to at least one of parsing or color-coding a language.

2. The system of claim 1, further comprising an interface component configured to receive the specification of primitive rules.

3. The system of claim 1, wherein the primitive rules define higher-level rules.

4. The system of claim 1, wherein the primitive rules each comprise a name and a definition.

5. The system of claim 1, wherein the grammar provided by the regular expression grammar component includes regular expression grammar rules.

6. The system of claim 1, wherein the rule compilation component is optimized to generate a non-terminal symbol corresponding to a rule only once.

7. The system of claim 1, wherein the complex regular expression defines a pattern to parse program language constructs.

8. A regular expression method, comprising using a processor coupled to a memory to perform at least one of the following operations:

receiving a set of rules collectively identifying a pattern, and including non-terminal rules having corresponding symbol definitions;

recursively searching the set of rules for each non-terminal symbol definition;

based on the recursively searching, determining whether a non-terminal symbol is missing and whether a circular reference is detected;

if the recursively searching determines that a non-terminal symbol is missing or a circular reference is detected, generating an error, otherwise continuing the recursively searching;

for each non-terminal symbol found, replacing the non-terminal symbol with an expanded representation;

constructing a terminal representation from each expanded representation;

processing the terminal representation against data to identify matches; and provisioning of design time assistance including at least one of color-coding, formatting, automatic code completion or error detection.

9. The method claim 8, further comprising including name definition pairs in the set of rules.

10. The method of claim 9, further comprising:

defining a higher-level rule as a function of lower-level rules.

11. The method of claim 8, further comprising computing a non-terminal symbol at most once.

12. The method of claim 8, further comprising identifying a language grammar associated with the set of rules.

13. The method of claim 8, further comprising providing a suggestion for automatic statement completion as a function of a rule specification.

14. A computer-readable storage medium tangibly embodying instructions for performing a method according to claim 8.

* * * * *